April 25, 1950 B. TREVOR 2,505,074
DIVERSITY RECEIVER SYSTEM
Filed March 15, 1947
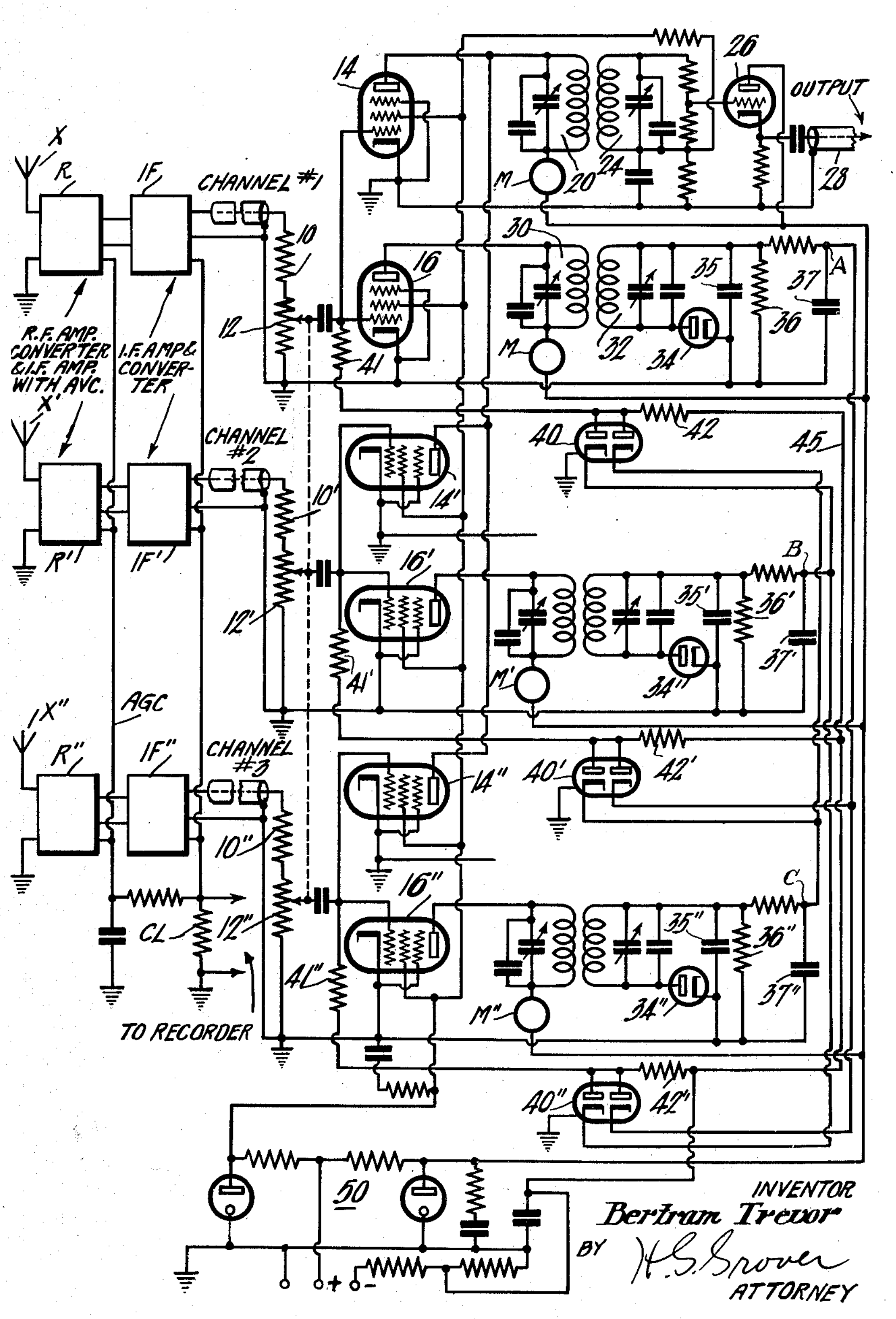
INVENTOR
Bertram Trevor
BY H. S. Grover
ATTORNEY Patented Apr. 25, 1950

2,505,074

UNITED STATES PATENT OFFICE 2,505,074

DIVERSITY RECEIVER SYSTEM

Bertram Trevor, Riverhead, N. Y., assignor to Radio Corporation of America, a corporation of Delaware Application March 15, 1947, Serial No. 734,980

2 Claims. (Cl. 250—20)

In this application I disclose an improved means for selecting the strongest of several versions of the same signal.

In my assignee's communication systems receivers in triple diversity are used for the reception of "on-off" telegraphy signals and also for program material such as voice, music, facsimile and so forth. In these systems, the well known arrangement of a common diode load resistor for the three receivers is used and the negative potential developed thereacross is used for automatic gain control purposes. This diode load in other words is common to all of the gain control circuits and the selected signal of audio frequency may also be taken from this load. The arrangement is such that the diode connected with the output of that receiver getting the strongest signal is effective to pass signal or output to the common load whereas all of the receivers getting weaker signals are blocked and do not supply output to their diodes of sufficient magnitude to overcome the biases thereon to supply output. In this manner, selection of output from the receiver getting the strongest signal is made and the selection is made at audio frequency. The signal selected at audio frequency appears on said common load or a separate common load and is recorded if it is telegraphy, or applied to audio frequency circuits if voice or music.

It is desired to use said receivers in circuits where it is necessary to make the signal selection at intermediate frequency rather than at audio frequency as is done in said systems. For example, it is desired to use carrier exaltation in the intermediate frequency stages of a diversified system and the best IF signal carrier is to be selected.

The primary object of my invention is to provide improved and simple means of selecting the strongest output from a three set diversity receiver combination.

The gain control potential is used in common automatic gain control circuits in said above mentioned system. Thus, it may be said that the overall gains of the three receivers are maintained approximately the same; hence, the strongest signal at a particular receiver input will supply the strongest intermediate frequency output. In the case of an exalted carrier receiver, it is sometimes preferable to select the best IF output before carrier exaltation and detection. My selector unit accomplishes this selection at intermediate frequency and has the advantage of simplicity over prior systems. My invention is equally applicable to many other uses where the best signal of several signals is to be selected for use.

In the description given above and hereinafter, it is assumed receivers in triple diversity are used. My invention is equally applicable to two receiver diversity systems.

In describing my invention in detail, reference will be made to the attached drawings wherein the single figure illustrates an embodiment of my improved signal selector system. In the drawings, there are three channels numbered 1, 2 and 3. It is assumed that carrier currents of relatively low frequency such as, for example, of intermediate frequency, modulated by the same signal and derived from diversified sources, appear at channels 1, 2 and 3. Moreover, it is assumed that these signal modulated intermediate frequency carriers are of strengths or magnitudes uniformly related to received signals from which they are derived so that the strongest thereof may be said to be derived from the strongest signal received.

The intermediate frequency carrier on channel 1 is applied across a resistor 10 and the resistor of a potentiometer 12. The IF carriers on channels 2 and 3 are similarly applied to voltage dividing resistors, labeled 10', 12' and 10'' and 12''. The signals on the three channels are each applied to the control grids of a pair of tubes 14 and 16, 14', 16', 14'' and 16''. The output electrodes of tubes 14, 14' and 14'' are tied together and connected to a circuit 20 tuned to the intermediate frequency and including an inductance forming the primary winding of a transformer, the secondary winding of which is included in a similarly tuned circuit 24. The circuit 24 is connected to the control grid of a cathode follower stage tube 26 which supplies output for uses as desired over a line 28. As will be described hereinafter, the strongest intermediate frequency output is selected and supplied by circuits 20, 24 to amplifier 26 and put to such use as desired.

The tubes 16, 16' and 16'' are in the circuits wherein the relative strengths of the intermediate frequency carriers are in effect compared and used in rectifiers to supply the control potentials which determine whether or not tube 14 or 14' or 14'' will supply the useful output to tube 26. Tube 16 has its anode coupled to a circuit 30 tuned to the intermediate frequency and including a winding coupled to a similarly tuned circuit 32 in a rectifier circuit including the diode 34 and its load resistor 36. The resistor 36 is shunted by IF filter condensers 35 and 37 to remove voltage variations faster than those caused by variations in the average value of the IF currents. The diode 34 is so poled as to provide at the ungrounded or diode anode end of resistor 36 a negative potential, the magnitude of which depends on the strength of the signal fed to tube 16. Tubes 16′ and 16″ are each similarly connected by similarly tuned circuits to similar rectifiers and filters. The circuit couplings and elements in these connections have been designated by numerals corresponding to those used in the connections to the output electrode of tube 16 with primes added to those connected to tube 16′ and double primes added to those connected to tube 16″. The operation of the circuits then is such that across resistors 36, 36′ and 36″ potentials are developed which are negative and of magnitudes which increase as the strength of the signals applied to the respective tubes 16, 16′ and 16″ increases.

These potentials are then compared as follows: The potential appearing across the load resistor 36 is fed to one of the cathodes of a double diode 40′ and one of the cathodes of a double diode 40″. The potential developed across the resistor 36′ is applied to one of the cathodes of the double diode 40 and one of the cathodes of the double diode 40″. The potential developed across the load resistor 36″ is applied to one of the cathodes of the double diode 40′ and to one of the cathodes of the double diode 40. The diodes 40, 40′ and 40″ may be considered valves since the same will not operate unless the cathodes thereof are negative with respect to the anodes. The anodes of the diodes 40 are tied together and connected to the control grids of tubes 14 and 16 by bias resistor 41. These anodes are also connected by resistor 42 and lead 45 to a source of potential which is negative with respect to ground and/or the cathodes of all of the tubes 14, 16, 14′, 16′, 14″ and 16″. Both anodes of tube 40′ and tube 40″ are similarly tied together and connected to the control grids of tubes 14′, 16′ and 14″ and 16″ respectively. The anodes of these double diodes are also similarly connected by resistors 42′ and 42″ to said negative potential source.

A source of supply potentials including voltage regulating tubes is shown at 50 and the showing is self explanatory. Voltage regulator tubes are included since constant D. C. potentials are desirable in the signal selector circuits. Milliammeters M may be used throughout the circuit as desired for adjustment and tuning purposes.

The operation of the system is as follows:

The voltages at the points A, B and C are negative relative to ground by amounts which are a measure of the magnitude of the intermediate frequency at inputs 10, 10′ and 10″. The bias developed at point A, when negative enough to overcome the fixed negative bias fed by resistors 42″ and 42′ to the anodes of these diodes, is fed by one side of double diode 40″ and by one side of double diode 40′ to the control grids of tubes 16″, 14″ and 16′ and 14′ respectively. The bias developed at point B when negative enough to overcome the fixed negative bias fed by resistors 42″ and 42 to the anodes of these diodes, is fed by one side of double diodes 40″ and 40 to the control grids of tubes 16″, 14″ and 16, 14 respectively. The bias developed at point C when negative enough to overcome the fixed negative bias fed by resistor 42′ and 42 to the anodes of these diodes is fed by one side of double diodes 40′ and 40 to the control grids of tubes 16′, 14′ and 16, 14 respectively. Note then that each of the rectifiers 34, 34′ and 34″ supplies potentials to the pair of tubes in two of the channels so that in effect, each of the voltages is compared with the other voltages.

Assume for example, that the intermediate frequency input at channel 1 is stronger than the inputs on channels 2 and 3. The potential developed at the point A will be more negative than the potentials at points B and C. For example, assume that a negative potential of approximately 12 volts is developed at the point A. This potential is applied to the cathodes of one of the diodes in tube 40′ and one of the diodes in tube 40″. The negative potential on the anodes thereof applied by resistors 42′, 42″ might be, for example, minus 3 volts. Then, the said diodes would have their anodes more positive than their cathodes and would be conductive. The anodes thereof would become more negative by an amount equal to the fixed potential plus a portion of the 12 volts developed at A. This potential is made to be sufficient to bias tubes 16″, 14″, 16′ and 14′ to cut off so that they do not supply intermediate frequency energy to their diodes to develop high negative potentials at the points B and C. Hence, points B and C do not feed negative potential through the double diodes of tube 40 to cut off the tubes 16 and 14. The action of diode 40 then is such as to feed only the fixed negative potential through resistor 42, and 41 to the control grids of tubes 16 and 14. These tubes then operate in a normal class A manner to supply output to tube 26 for use as desired and to supply intermediate frequency energy to the rectifier 34 to maintain the remaining channels blocked as long as the signal in channel 1 is the strongest. In this manner, channel 1 supplies the used output as long as its signal is strongest. If the input to channel 1 decreases and the input to channel 2, for example, increases and becomes the strongest signal, then a sudden switching action takes place because the potential developed at B becomes more negative, say approximately 12 volts, to apply negative bias through double diodes 40 to the control grids of tubes 16 and 14 and also through double diode 40″ to the control grids of tubes 16″ and 14″. Then these latter tubes are cut off and output is supplied as described hereinbefore from tube 14′ connected at its input to channel 2. The tube 16′ is then also operating class A to maintain the negative potential at B as long as the signal on channel 2 is strongest.

The circuit then is a three-way trigger or switcher operating in such a manner that only one receiver at a time can contribute to the output except during the brief switch-over periods which occur when one input is dropping and the other increasing in amplitude.

The diodes 40, 40′ and 40″ are provided to give one-way paths to feed negative bias from points A, B and C to the control grids of the amplifier tubes. This provides proper isolation between the three channels and allows the negative three volt bias to be supplied to the conducting channel without interference from the cross connected diode biases at A, B and C.

The signals appearing at channels 1, 2 and 3 are as stated above assumed to be derived from a diversity system and to represent the received diversified signals. In practice, it is advisable to gang the potentiometers 12, 12′ and 12″ in order to facilitate the proper signal level input to derive the switching action described hereinbefore.

The signals in channels 1, 2 and 3 may be derived from a diversity system such as shown by block diagram in the figure. The three antennas X, X' and X'' supply input to three receivers R, R' and R'' each comprising radio frequency amplifiers, a frequency converter, and intermediate frequency amplifiers. These receivers supply output to intermediate frequency stages IF, IF' and IF'' wherein further frequency conversion may take place when desired. Each of the intermediate frequency stages may include a rectifier which supplies a common load CL. The potential developed across CL is used for automatic gain control purposes, and then the signal strength on channels 1, 2 and 3 will be a measure of the strength of the signals received on the respective antennas X, X' and X''.

What is claimed is:

1. In means for sensing the strongest of at least two carrier currents in at least two channels, a rectifier circuit for each current and channel, a load impedance in each rectifier circuit, means for feeding each of the currents to its respective rectifier circuit, an impedance for each current and in each channel at which impedances potentials are to be set up which are measures of the relative magnitudes of the said currents, a pair of one-way valves for each of said last named impedances, said valves each having an input electrode and an output electrode, the output electrodes of each pair being tied together and coupled to their corresponding measuring impedance, and means for feeding the potential developed in each of said rectifier circuit load impedances to the input electrodes of the valves connected to all of said impedances except to those two valves connected to the measuring impedance corresponding to the current and channel producing the developed potential.

2. In means for sensing the strongest of at least two carrier currents in at least two channels, a rectifier circuit in each channel, a load impedance in each rectifier circuit, means for feeding each of the currents to its respective rectifier circuit, an impedance for each current and in each channel at which impedances potentials are to be set up which are measures of the relative magnitudes of the said currents, a pair of one-way valves connected to each of said measuring impedances, and means for feeding the rectified potential in each of said rectifier circuit load impedances to all of said measuring impedances except that one corresponding to the current and channel producing the said rectified potential, said last-named means including one of said one-way valves in each of the connections between the rectifier load impedances and the said measuring impedances.

BERTRAM TREVOR.

REFERENCES CITED

The following references are of record in the file of this patent:

UNITED STATES PATENTS

| Number | Name | Date |
|---|---|---|
| 1,792,312 | Labus | Feb. 10, 1931 |
| 2,171,657 | Klotz | Sept. 5, 1939 |
| 2,200,049 | Van Loon | May 7, 1940 |
| 2,249,425 | Hansell | July 15, 1941 |
| 2,414,111 | Lyons | Jan. 14, 1947 |